United States Patent
Lee et al.

(10) Patent No.: US 11,975,263 B2
(45) Date of Patent: May 7, 2024

(54) IMAGE STABILIZATION SYSTEM AND METHOD

(71) Applicant: Dell Products, L.P., Round Rock, TX (US)

(72) Inventors: Siew Fei Lee, Singapore (SG); Wei-Kuo Yu, Singapore (SG); Lei Guo, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 316 days.

(21) Appl. No.: 17/455,730

(22) Filed: Nov. 19, 2021

(65) Prior Publication Data

US 2023/0158402 A1    May 25, 2023

(51) Int. Cl.
| | |
|---|---|
| A63F 13/52 | (2014.01) |
| A63F 13/77 | (2014.01) |
| G06T 5/20 | (2006.01) |
| G06T 5/50 | (2006.01) |
| G06T 7/00 | (2017.01) |

(52) U.S. Cl.
CPC .............. *A63F 13/52* (2014.09); *A63F 13/77* (2014.09); *G06T 5/20* (2013.01); *G06T 5/50* (2013.01); *G06T 7/0002* (2013.01); *G06T 2207/10016* (2013.01); *G06T 2207/30168* (2013.01)

(58) Field of Classification Search
CPC . A63F 13/52; A63F 13/77; G06T 5/50; G06T 5/20; G06T 7/0002; G06T 2207/10016; G06T 2207/30168
See application file for complete search history.

(56) References Cited

U.S. PATENT DOCUMENTS

| | | | | |
|---|---|---|---|---|
| 2009/0219401 A1* | 9/2009 | Drouot | ............... | H04N 23/6811 348/208.4 |
| 2011/0134329 A1* | 6/2011 | Chen | ................. | H04N 23/6811 348/E5.066 |
| 2013/0033612 A1* | 2/2013 | Wu | .......................... | G06T 5/002 348/208.6 |
| 2014/0132786 A1* | 5/2014 | Saitwal | .............. | H04N 23/6811 348/208.99 |
| 2017/0359515 A1* | 12/2017 | Harris | .................... | H04N 23/68 |
| 2018/0041709 A1* | 2/2018 | Konttori | ................ | H04N 23/57 |
| 2018/0213250 A1* | 7/2018 | Ikonin | .................... | H04N 19/82 |
| 2019/0317659 A1* | 10/2019 | Johnson | ................. | G06F 1/163 |
| 2020/0077023 A1* | 3/2020 | Kang | ................. | H04N 23/6812 |
| 2021/0266443 A1* | 8/2021 | Yi | .......................... | H04N 23/90 |
| 2023/0209193 A1* | 6/2023 | Lee | ........................ | H04N 23/69 348/208.6 |
| 2023/0209202 A1* | 6/2023 | Yun | ........................ | H04N 23/73 348/208.11 |
| 2023/0367571 A1* | 11/2023 | Bi | ........................... | G06F 9/505 |

\* cited by examiner

*Primary Examiner* — Steve Rowland
(74) *Attorney, Agent, or Firm* — Fogarty LLP

(57) ABSTRACT

Systems and methods for image stabilization of video imagery generated by applications are disclosed. In some embodiments, an Information Handling System (IHS) may include executable instructions to receive a video stream from an application executed on the IHS, identify a level of jitter in the video stream, and process the video stream by re-positioning imagery in the video stream to compensate for the jitter. The instructions may then display the processed video stream on a display. The display displays the processed video stream in place of the video stream generated by the application.

15 Claims, 8 Drawing Sheets

IMAGE STABILIZATION SYSTEM AND METHOD

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Certain IHSs, such as gaming systems, media players and the like can establish graphics and/or video outputs for displays and other video systems. For example, an IHS can provide various graphical user interface elements to a video monitor that displays the graphical user interface elements to a user. Gaming systems can interface with monitors, televisions, or virtual reality displays, among others. These user systems include video processor elements, such as graphics cards, graphics processing cores, as well as various display interface circuitry and connectors. However, as popularity with high-performance gaming and video-intensive virtual or augmented reality systems have increased, so has the need for managing the level and content of video imagery generated by the gaming systems.

SUMMARY

Systems and methods for image stabilization of video imagery generated by applications are disclosed. That is, a system and method for adaptive stabilize image for display devices is provided. In some embodiments, an Information Handling System (IHS) may include executable instructions to receive a video stream from an application executed on the IHS, identify a level of jitter in the video stream, and process the video stream by re-positioning imagery in the video stream to compensate for the jitter. The instructions may then display the processed video stream on a display. The display displays the processed video stream in place of the video stream generated by the application.

According to another embodiment, an image stabilization method includes the steps of receiving a video stream from an application executed on the IHS, wherein video stream comprises a plurality of ongoing frames, identifying a level of jitter in the video stream, and processing the video stream by re-positioning imagery in the video stream to compensate for the jitter. The method may then display the processed video stream on a display.

According to yet another embodiment, a hardware memory device stores computer-executable instructions to receive a video stream from an application executed on an HIS, identify a level of jitter in the video stream, process the video stream by re-positioning imagery in the video stream to compensate for the jitter, and display the processed video stream on a display.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
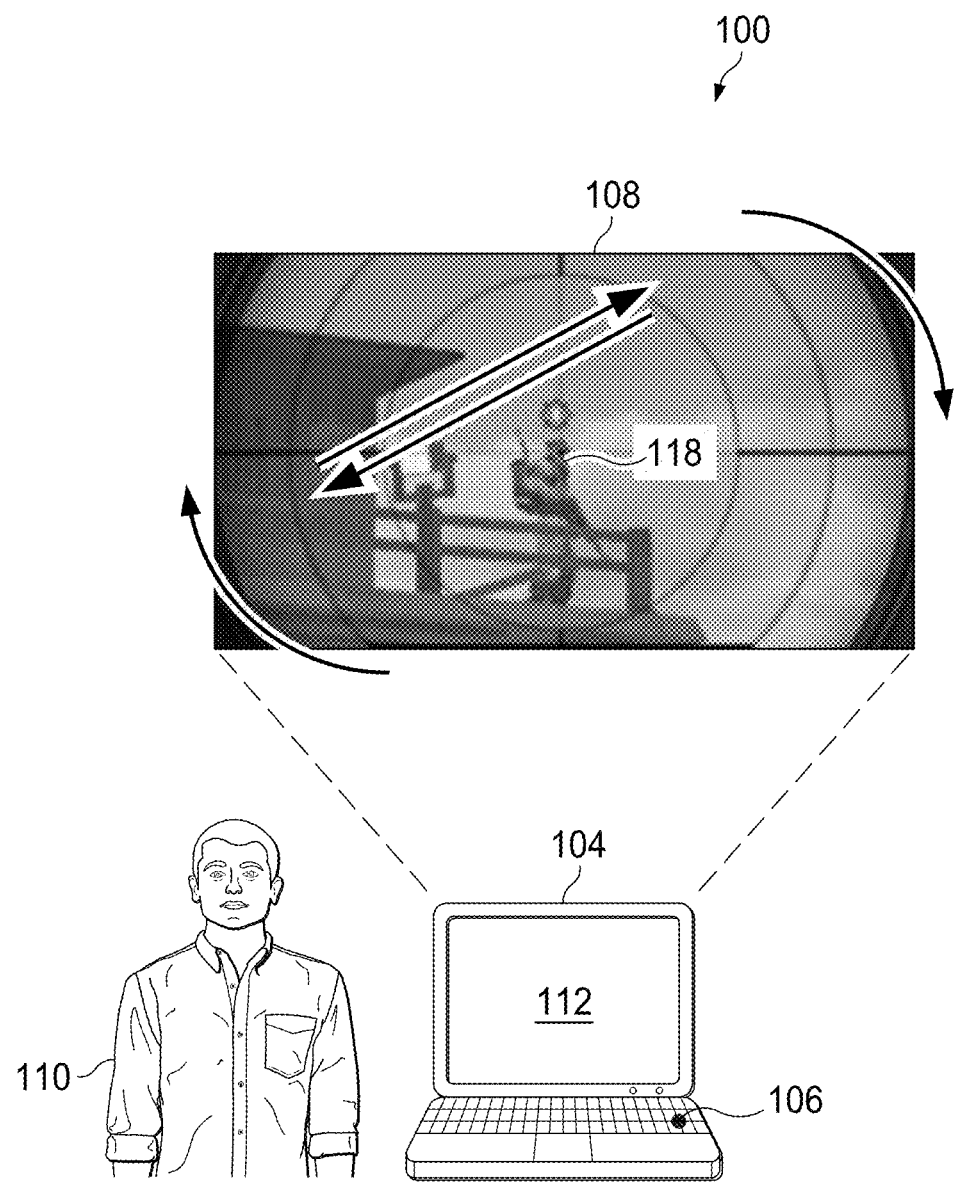
FIG. 1 illustrates an example image stabilization system that may be used to stabilize jitter present in a video stream according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Corresponding numerals and symbols in the different figures generally refer to corresponding parts, unless otherwise indicated. The figures are not necessarily drawn to scale. In the drawings, like reference numerals refer to like elements throughout, and the various features are not necessarily drawn to scale. In the following discussion and in the claims, the terms "including," "includes," "having," "has," "with," or variants thereof are intended to be inclusive in a manner similar to the term "comprising", and thus should be interpreted to mean "including, but not limited to . . . " Also, the terms "coupled," "couple," and/or or "couples" is/are intended to include indirect or direct electrical or mechanical connection or combinations thereof. For example, if a first device couples to or is electrically coupled with a second device that connection may be through a direct electrical connection, or through an indirect electrical connection via one or more intervening devices and/or connections. Terms such as "top," "bottom," "front," "back," "over," "above," "under," "below," and such, may be used in this disclosure. These terms should not be construed as limiting the position or orientation of a structure or element, but should be used to provide spatial relationship between structures or elements.

Embodiments of the present disclosure are directed to a system and method for stabilizing video imagery generated by an application, such as a gaming application. Whereas current trends in application development have yielded imagery that can mimic various forms of jitter (e.g., bounce, bodily movement, breathing, character movements, weapon recoils, vibrations, shock, etc.), the level of jitter may sometimes be excessive for the user's taste. Embodiments of the present disclosure provide a solution to this problem, among others, by providing an image stabilization system and method that compensates for jitter generated by these applications by identifying a level of jitter in a video stream, processing the video stream by re-positioning imagery in the video stream, and displaying the processed video stream in place of the video stream generated by the application.

Current trends in game development have involved imparting realism into games in which one aspect includes simulating causal effects of actual events that cause jitter (e.g., heavy breathing, exhaustion, weapon recoils, explosions, etc.). Unfortunately, players of the games are often not allowed to reduce or customize the effects of such simulated jitter. The realism may sometimes increase the difficulty level unnecessarily and hinder players from having an enjoyable gaming experience, especially those that suffer from motion sickness when the imagery jitters or flashes too much or too quickly.

Additionally, there currently exist no tools to stabilize a jittery video stream, such as one generated by a computer-based game using a hardware assisted image stabilizing methodology on a display device. Such reasons may include the lack of sophistication in gaming imagery historically provided by computer-based games. That is, early computer-based games often did not purposefully impart jitter into their game offerings because the IHSs on which these games were run did not possess the performance requirements to do so.

Nevertheless, advances in IHS technology have enabled a relatively large level of realism to be imparted to video imagery generated by games. This level of realism, however, can sometimes be undesirable for the user. Control of the generated imagery is typically proprietary to the applications (e.g., games) that use such devices. Developers who create the applications only offer limited customization of their generated imagery. For example, games often only provide certain visual effect control, such as telescopic zooming, or displaying of simulated speed, fuel, altitude, aim reticle(s), and the like. Additionally, the applications, in many cases, do not offer effective and dynamic visual enhancement to imagery that improves a user's visual experience during gameplay. As will be described in detail herein below, embodiments of the present disclosure provide a solution to this problem using an image stabilization system and method that reduces jitter in video imagery produced by these computer-based games so that user enjoyment can be enhanced.

FIG. 1 illustrates an example image stabilization system 100 that may be used to stabilize jitter present in a video stream according to one embodiment of the present disclosure. The image stabilization system 100 includes an IHS 104 that is configured to execute an application 106 and generate video imagery 108 for a user 110. Although the present embodiment describes the use of a display 112 of an IHS 104 for displaying video imagery 108 generated by the application 106, it should be appreciated that in other embodiments, the system 100 may stabilize the video imagery 108 on other displays, such as on a Head-Mounted Display (HMD).

The application 106 may be any suitable type that generates video imagery for which image stabilization may be desired. In one embodiment, the application 106 may include a gaming application in which its developers designed the gaming application to produce video imagery with jitter. In another embodiment, the application 106 may include a training application that generates video imagery with training content in which jitter is imparted. In yet another embodiment, the application 106 may be configured to generate entertainment video imagery, such as movies or instructional videos, in which undesired jitter has been imparted.

Within this disclosure, the term 'jitter' may be used to describe any cyclic movement of the video imagery 108 relative to the position of the physical objects 118 in the video imagery 108. For example, the jitter may include linear movement of the video imagery in which it moves linearly relative to the physical objects 118, and rotational movement of the video imagery 108 in which it moves about an axis relative to the physical objects 118. For example, jitter may be the resulting effect of bouncing, bodily movement, or a shock imparted onto a camera or other device that obtains the video imagery 108. Within the context of computer-based games, jitter may be the simulated result of breathing, character movements, weapon recoils, vibrations, and the like that may be experienced by the user.

According to embodiments of the present disclosure, the image stabilization system 100 includes instructions stored in a memory and executed by a processor to receive a video stream from the application 106, identify a level and direction of jitter in the video stream, process the video stream by re-positioning imagery in the video stream to compensate for the jitter, and display the processed video in place of the video stream generated by the application 106. In some aspects, the image stabilization system 100 may be considered to provide Digital Image Stabilization (DIS) and/or Artificial Intelligence Stabilization (AIS) technology that shifts the image locally from frame to frame to reduce distracting vibrations from video imagery by smoothing the transition from one frame to another. In some embodiments, by estimating the video frames in real-time to detect movement, the frame rate of the display 112 may be consistent with the video stream's native frame rate for providing a sharp and detailed image with reduced blur, thus providing an advantage to users.

The output video imagery from the image stabilization system 100 may be overlaid on the display 112 in any suitable manner. In one embodiment, the video imagery may be overlaid by the visual effect management system 100 by communicating with a scalar device 110 (e.g., a Liquid Crystal Display or "LCD" controller coupled to a memory having program instructions stored thereon and mounted on a Printed Control Board or "PCB") configured in the display 106. In general, the scalar device 110 is often included with most displays for converting different video signals (e.g., HDMI, VGA, DisplayPort, etc.) into a format that can be used to generate pixels on the display 112. The scalar device 110 may also include image processing capabilities to manipulate how those pixels are generated on the display 112. The visual effect management system 100 may communicate with the scalar device 110 to alter how the video imagery that is displayed on the display 112.

Figure 2:
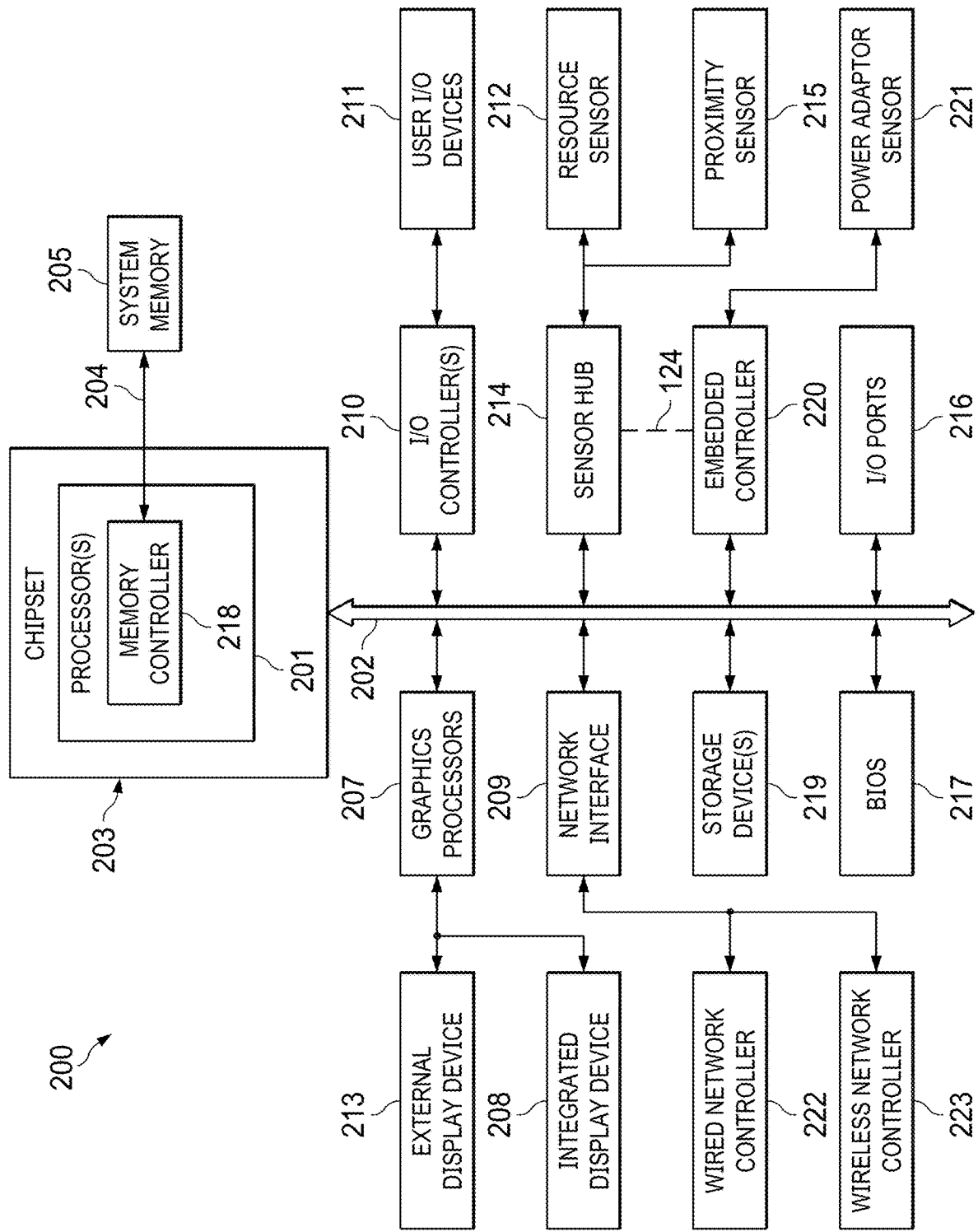
FIG. 2 is a block diagram illustrating components of an IHS configured to implement embodiments of the image stabilization system and method according to one embodiment of the present disclosure.

FIG. 2 is a block diagram illustrating components of an IHS 200 configured to implement embodiments of the image stabilization system and method according to one embodiment of the present disclosure. IHS 200 may be incorporated in whole, or part, as IHS 104 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated display devices 208 and external display devices 213 may be configured for a particular user. For instance, a particular user may prefer specific brightness settings that may vary the display brightness based on time of day and ambient lighting conditions. In one embodiment, the integrated display device 208 and/or external display device 213 may include a scalar device 110 that can be used to manipulate video imagery that is displayed on a monitor.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a SoC.

Figure 3:
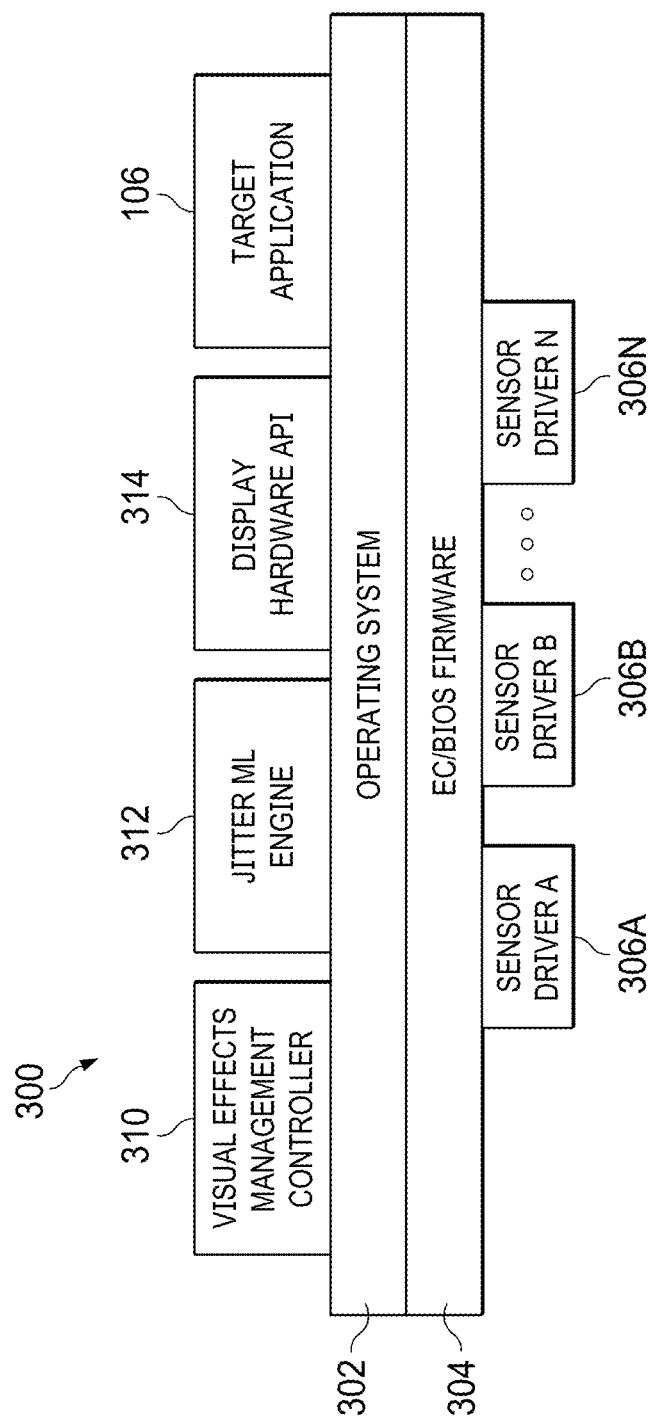
FIG. 3 is a block diagram illustrating an example of a software system produced by IHS for managing visual effects according to one embodiment of the present disclosure.

FIG. 3 is a block diagram illustrating an example of a software system 300 produced by IHS 200 for managing visual effects according to one embodiment of the present disclosure. In some embodiments, each element of software system 300 may be provided by IHS 200 through the execution of program instructions by one or more logic components (e.g., processors 201, BIOS 217, EC 220, etc.) stored in memory (e.g., system memory 205) and/or storage device(s) 219. As shown, software system 300 includes a visual effects management controller 310 configured to manage visual effects imparted onto a video stream generated by an application 106.

Both visual effects management controller 310 and application 106 are executed by an OS 302, which is turn supported by EC/BIOS instructions/firmware 304. EC/BIOS firmware 304 is in communications with, and configured to receive data collected by, one or more sensor modules or drivers 306A-306N, which may abstract and/or interface with hardware resource sensor 212, proximity sensor 215, and power adapter sensor 221, for example. In some embodiments, drivers 306A-306N, may be configured to receive user input from a keyboard, mouse, and/or touch screen display for configuring the operation of the visual effects management controller 310.

Jitter machine learning (ML) engine 312 performs a machine learning process to derive certain application performance features associated with the application 106 executed by IHS 200. Jitter ML engine 312 monitors the video stream generated by the application 106. For example, jitter machine learning engine 312 may obtain telemetry data from the OS 302, and/or directly from sensors 306A-306N configured in IHS 200 to determine characteristics of the video stream. Once the jitter machine learning engine 312 has collected characteristics over a period of time, it may then process the collected data using statistical descriptors to extract the jitter characteristics of the application 106. For example, the jitter machine learning engine 312 may monitor the application 106 over time to estimate its resource usage with respect to various aspects, such as which actions performed by the application 106 cause certain jitter events to occur, and the like. Once jitter machine learning service 312 has collected characteristics over a period of time, it may then process the collected data using statistical descriptors to extract the estimated jitter generated by the application 106. The jitter machine learning engine 312 may use a machine learning algorithm such as, for example, a Bayesian algorithm, a Linear Regression algorithm, a Decision Tree algorithm, a Random Forest algorithm, a Neural Network algorithm, or the like.

The visual effects management controller 310 communicates with the display hardware API 314 to impart user-supplied visual effects to the imagery 108 that is displayed on the display of the IHS. In other embodiments, the visual effects management controller 310 communicates with a scalar device 110 configured in the display 112 to render video imagery that is displayed to the user, such as described above with reference to FIG. 1.

The display hardware API 314 may be used by the application 106 to convert digital signals or code to a form that may be displayed on the display 112. For example, the display hardware API 314 may use a Graphical Processing Unit (GPU) configured on the IHS 104 to manipulate digital signals generated by the application 106. The visual effects management controller 310 may be configured to overlay certain visual effects on the imagery by communicating with the display hardware API 314 to manipulate how the imagery is overlaid with the visual effects. It may be important to note that the actions of the visual effects management controller 310 is generally independent of how the application 106 accesses the display hardware API 314. Thus, the visual effects management controller 310 may be configured to manipulate imagery independently of how the application 106 generates the imagery for display on the display 112. In one embodiment, the visual effects management controller 310 may generate an OSD on the display 112 that displays a list of available visual effect profiles, and by processing a gaze vector of the user's eyes, determine which visual effect profile is to be selected. In one embodiment, the visual effects management controller 310 includes at least a part of a Scalar Controller device provided by the DELL CORPORATION.

Figure 4:
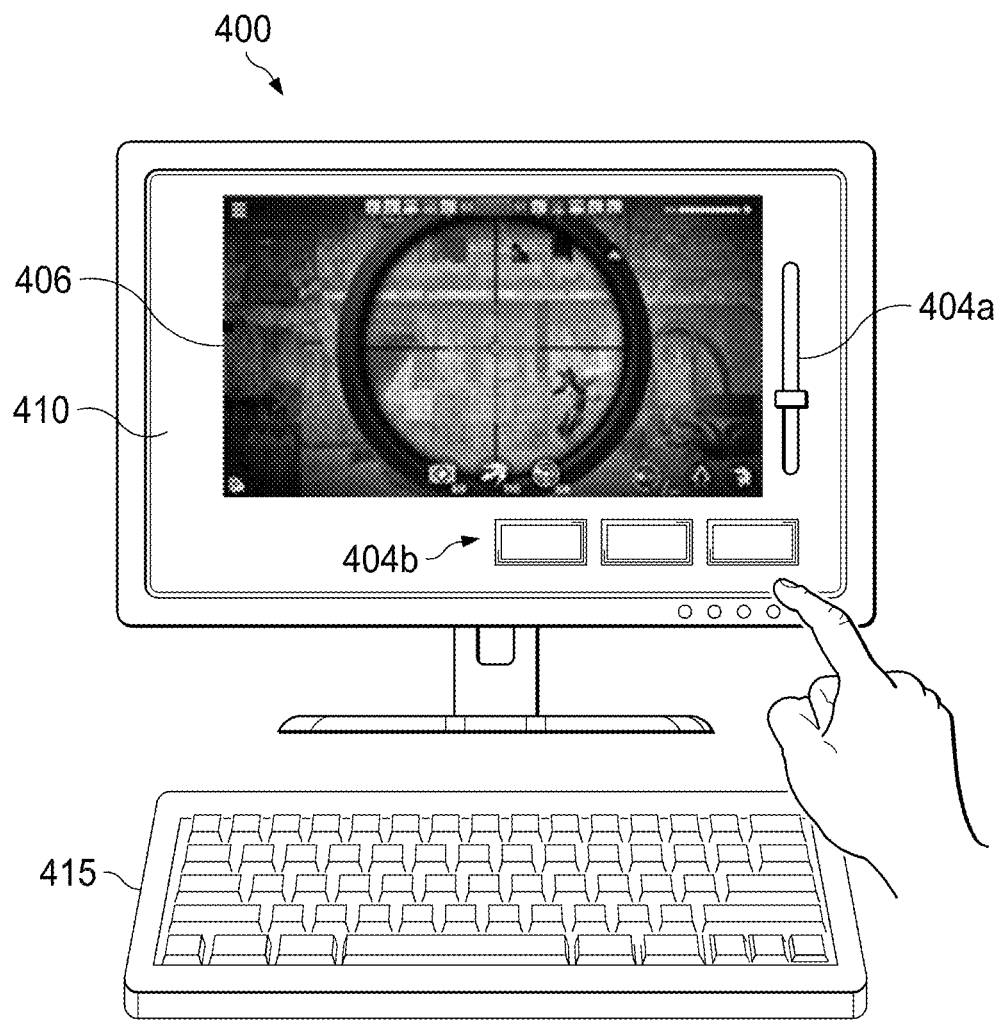
FIG. 4 illustrates an example video screen that may be displayed on a computer monitor by the visual effects management controller according to one embodiment of the present disclosure.

FIG. 4 illustrates an example video screen that may be displayed on a computer monitor 400 by the visual effects management controller 310 according to one embodiment of the present disclosure. In one embodiment, the visual effects management controller 310 may incorporate a display mode in which certain configurable aspects of the application 106 are displayed as selectable icons, such as a slider bar 404a, and/or one or more buttons 404b on a backdrop portion 410 of the monitor 400. For example, the monitor 400 may be a touch screen monitor that enables the user to configure various aspects of the application 106 and/or the video image 406 using the selectable icons 404a-b.

Additionally, the video image 406 generated on the display screen by the visual effects management controller 310 may comprise a portion of the overall display area of the monitor 400. That is, the visual effects management controller 310 may apply the visual effects to only a portion of the monitor's display area. In one embodiment, the size, shape, and/or location of the video image 406 on the display screen is configurable by a user. That is, the visual effects management controller 310 may be configured to receive user input for making the video image 406 larger, smaller, or moved to a different location on the display screen. In some cases, the screen may be partitioned into 3×3 regions (e.g., boxes, rectangles, or squares of pixels, etc.), and stabilization/processing/effects may be performed on the center box (or on a set of boxes) to the exclusion of other boxes. One particular example of such a video screen may include a AlienEye HUD application provided by the DELL CORPORATION.

The visual effects management controller 310 also provides configurable shortcut keys on a keyboard 415 for the user. For example, the visual effects management controller 310 may receive user input to configure a certain key, such as a function key (e.g., 'F8'), or a combination of keys (e.g., 'Control'+'F10') that may be used by the visual effects management controller 310 to perform various tasks, such as entering a setup mode for the system, selecting a certain video filter, and the like.

FIGS. 5 through 8 described herein below provide various methods 500, 600, and 800 that may be performed by the image stabilization system to stabilize video imagery generated by an application 106. For each of the methods 500, 600, and 800, some, most, or all steps may be performed by video effects management controller 310 of FIG. 3. The methods 500, 600, and 800 described herein below may be performed for each frame in the video stream generated by the application 106.

Generally speaking, methods 500, 600, and 800 describe a local motion estimation technique, an AI estimation technique, a software low-pass filtering technique, and a key frame keeping technique that may be used to stabilize video imagery generated by the application 106. In one embodiment, the image stabilization system 100 may alternatively use one of the techniques during a first time interval, and use another, different technique during a second time interval, and so on. For example, the image stabilization system 100 may use the local motion estimation technique during a first time interval (e.g., 10 seconds), and use the software low-pass filtering technique during an ensuing second time interval (e.g., 3 seconds) to stabilize the video imagery generated by the application 106. In another embodiment, the image stabilization system 100 may select which technique to use based upon certain conditions. For example, the image stabilization system 100 may use a first technique when it determines that non-moving video imagery is encountered, and use a second technique when it determines that the video imagery possesses a relatively large amount of detail (e.g., alpha-numerical text information) that should be accurately re-produced.

Figure 5:
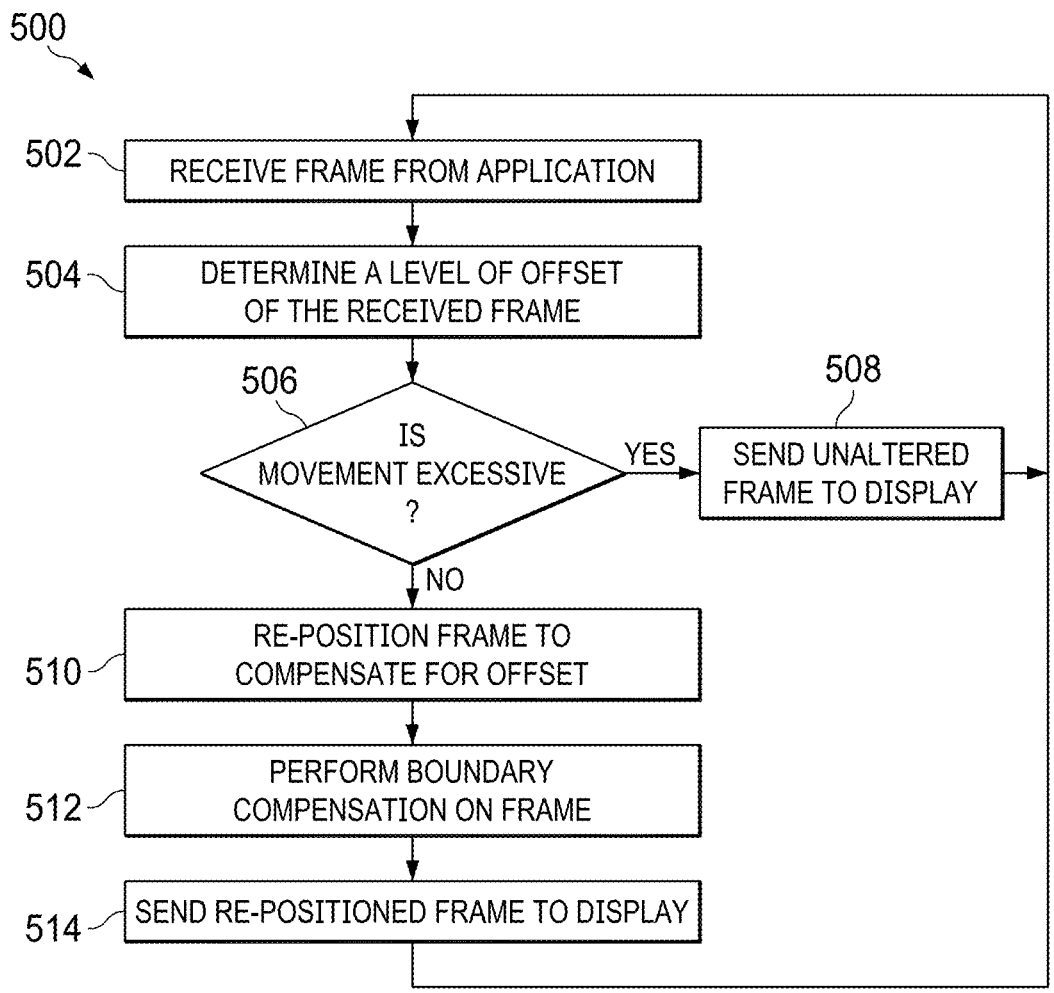
FIG. 5 illustrates one example method for stabilizing video imagery generated by an application on an IHS using a local motion estimation technique or an Artificial Intelligence (AI) estimation technique according to one embodiment of the present disclosure.

FIG. 5 illustrates one example method 500 for stabilizing video imagery generated by an application on an IHS using a local motion estimation technique or an Artificial Intelligence (AI) estimation technique according to one embodiment of the present disclosure. Initially at step 502, the method 500 receives a new frame from the application 106, and at step 504, determines a level of offset of the received frame.

In one embodiment, the method 500 determines a level of offset of a current frame to a previously received frame, and when the level of offset exceeds a specified threshold, it re-positions the current frame to compensate for the level of offset. For example, the method 500 may perform an offset calculation with the previously received frame. That is, the method 500 stores the previously received frame so that an offset calculation may be obtained. The offset calculation generally refers to an estimated amount of movement that has occurred between the newly received frame and the previously received frame. The offset calculation may be performed in any suitable manner. In one embodiment, the method 500 generates a histogram of similar pixels in the newly received frame and previously received frame in which the histogram identifies a level of movement. The movement may include linear movement as well as rotational movement.

In another embodiment, the method 500 determines a level of offset of a current frame to a plurality of previously received frames using an artificial intelligence (AI) estimation technique, and when the level of offset exceeds a specified threshold, it re-positions the current frame to compensate for the level of offset. For example, the method 500 may perform an AI algorithm to estimate movement based on current frame and multiple previous frames.

In general, the image stabilization controller 310 may perform an AI process to derive certain features associated with the video imagery, and estimate a movement of the video imagery according to the derived features. One example feature may include, for example, jitter in the video imagery that may have a certain amplitude, frequency, and/or direction. Another example feature may include identifying a characteristic in the video imagery that corresponds to a certain type of jitter. Furthering this example, the AI process may derive that the video imagery includes a gun that is being fired, and when fired, a certain amount of shock jitter occurs to the video imagery. Yet another example feature may include knowledge of a particular type (e.g., make and model) of application 106 that generates a unique type of jitter in the video imagery.

The AI process monitors characteristics of any jitter existing in the video imagery as well as the scenery (e.g., person, door, animal, airplane, etc.) included in the video imagery. Once the AI process has collected a sufficient number of frames over a period of time, it may then process the collected data in the frames using statistical descriptors to extract the features of the video imagery. The AI process may use an AI algorithm such as, for example, a Bayesian algorithm, a Linear Regression algorithm, a Decision Tree algorithm, a Random Forest algorithm, a Neural Network algorithm, or the like.

At step 506, the method 500 determines whether the movement is excessive. For example, the method 500 may compare the estimated level of movement against a threshold value, and if the level of movement exceeds the threshold value, determine that the frame should be re-positioned. In one embodiment, threshold value may be a configurable parameter that may be set by the user. Thus, the user may set a desired level of jitter to suit their taste, such as when they would like to reduce the level of jitter viewed in the video imagery while not entirely eliminating it. Nevertheless, if the movement is excessive, processing continues at step 510; otherwise, processing continues at step 508 in which the unaltered frame is sent to a display, such as the display 112 of the IHS 104.

At step 510, the method 500 re-positions the frame to compensate for the estimated offset, which may be a linear and/or a rotational offset. Thereafter at step 512, the method 500 performs a boundary compensation on the frame. When the frame is moved downward, for example, the top portion of the frame will be made void of any pixel information. Thus, boundary compensation may be used to generate additional pixels that may be added (e.g., padded) to the top portion of the frame. The boundary compensation may be performed in any suitable manner. In one embodiment, the boundary compensation may be performed by blurring, or at least partially replicating the pixel values of nearby pixels to fill the voided portion of the frame. Thereafter at step 514, the method 500 sends the re-positioned frame to the display 112. That is, the method 500 sends the re-positioned frame in lieu of the unaltered frame that was initially received.

The aforedescribed process is continually performed for each frame received from the application 106. Nevertheless, when use of the method 500 is no longer needed or desired, the method 500 ends.

Figure 6:
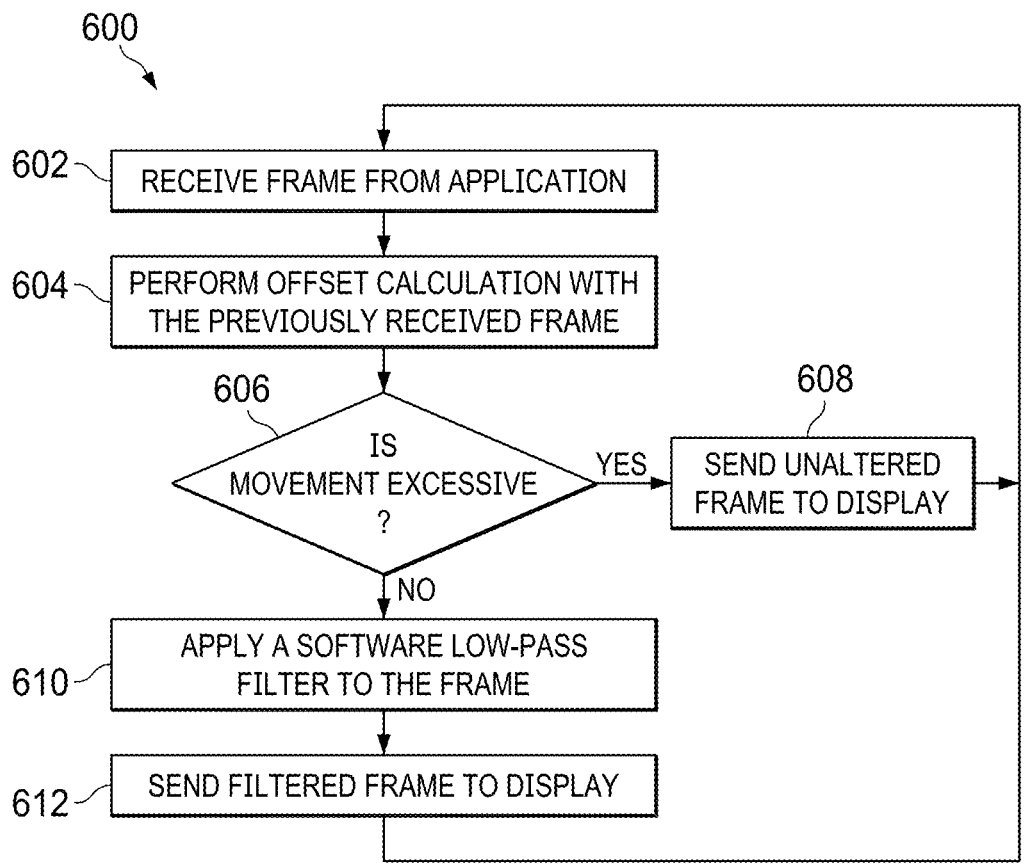
FIG. 6 illustrates another example method for stabilizing video imagery generated by an application on an IHS using a software low-pass filter according to one embodiment of the present disclosure.

FIG. 6 illustrates another example method 600 for stabilizing video imagery generated by an application on an IHS using a software low-pass filter according to one embodiment of the present disclosure. Initially at step 602, the method 600 receives a new frame from the application 106, and at step 604, performs an offset calculation with the previously received frame. In one embodiment, the offset calculation may be performed in a similar manner to how the method 500 performs the offset calculation at step 504.

At step 606, the method 600 determines whether the movement is excessive. For example, the method 600 may compare the estimated level of movement against a threshold value, and if the level of movement exceeds the threshold value, determine that the frame should be re-positioned. In one embodiment, the threshold value may be similar to the threshold value described above at step 606. Nevertheless, if the movement is excessive, processing continues at step 610; otherwise, processing continues at step 608 in which the unaltered frame is sent to a display 112.

At step 610, the method 600 applies a software low-pass filter to the frame. In one embodiment, the software low-pass filter may be processed according to equation:

$$T[n]*(x)+T[n-1]*(1-x)=T[n+1]$$

Where: T[n]: The current location at time n; T[n−1]: The previous location at time z−1; T[n+1]: The next location at time n+1; and x is a sensitivity level ranging from 0 to 1.

As shown in the equation above, variable 'x' makes the software low-pass filter adaptive. In general, a sensitivity level of 0 means that historical frames take priority (i.e., not sensitive to new values), while 1 means that current frames take priority (i.e., very sensitive to new values). For example, a sensitivity value of 0.5 means equal weight is given to past and present data. Thus, users of the image stabilization system 100 may be provided with a configurable level of filtering. The value of 'x' may be set by the user and/or by the image stabilization system 100. It should be noted that in other embodiments, the software low-pass filter may use equations other than what is shown herein above. For example, the equation may filter movement in the video imagery using more than one previous location variable and/or more than one next location variable. Additionally, the equation may not use the sensitivity level variable if it is not needed or desired.

Figure 7A:
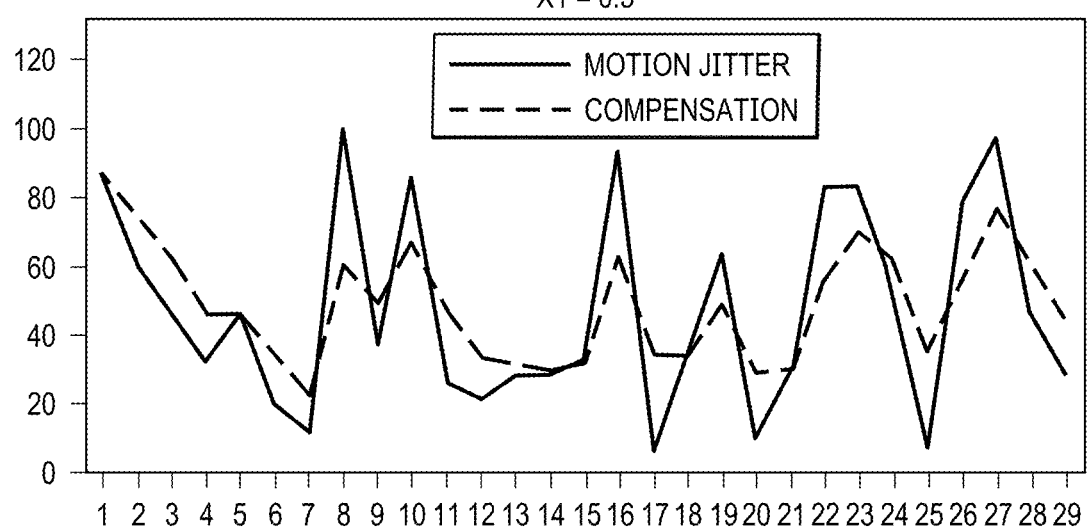
FIGS. 7A and 7B illustrate graphs of example image movement compensation that may result due to differing values of the sensitivity level of the software low-pass filter according to one embodiment of the present disclosure.
Figure 7B:
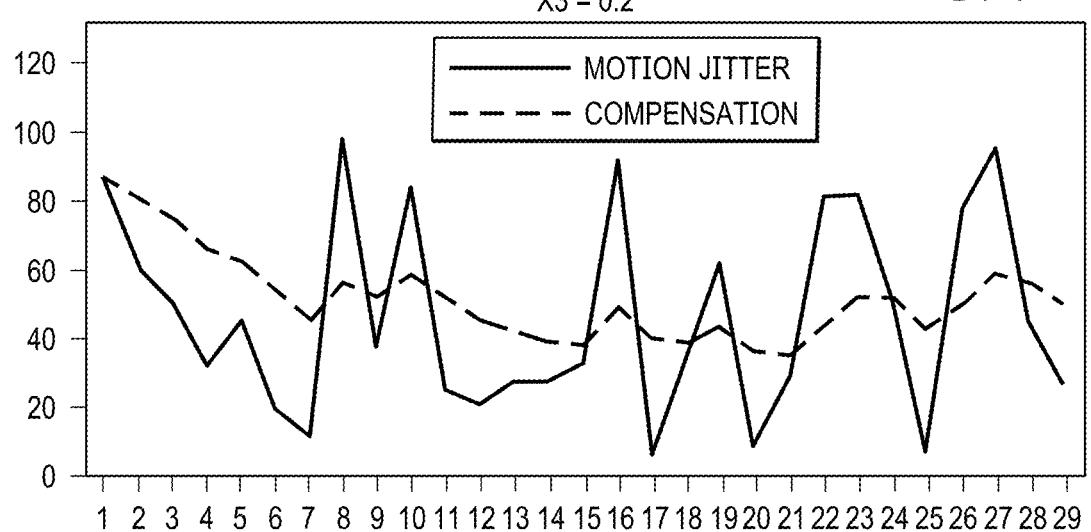

FIGS. 7A and 7B illustrate graphs of example image movement compensation that may result due to differing values of the sensitivity level of the software low-pass filter according to one embodiment of the present disclosure. In particular, FIG. 7A illustrates the image movement compensation that may result when the sensitivity level is set at 0.5, while FIG. 7B illustrates the image movement compensation that may result when the sensitivity level is set at 0.2.

Referring again to FIG. 6, the method 600 sends the filtered frame to the display 112 at step 612. That is, the method 600 sends the filtered frame in lieu of the unaltered frame that was initially received. The aforedescribed process is continually performed for each frame received from the application 106. Nevertheless, when use of the method 600 is no longer needed or desired, the method 600 ends.

Figure 8:
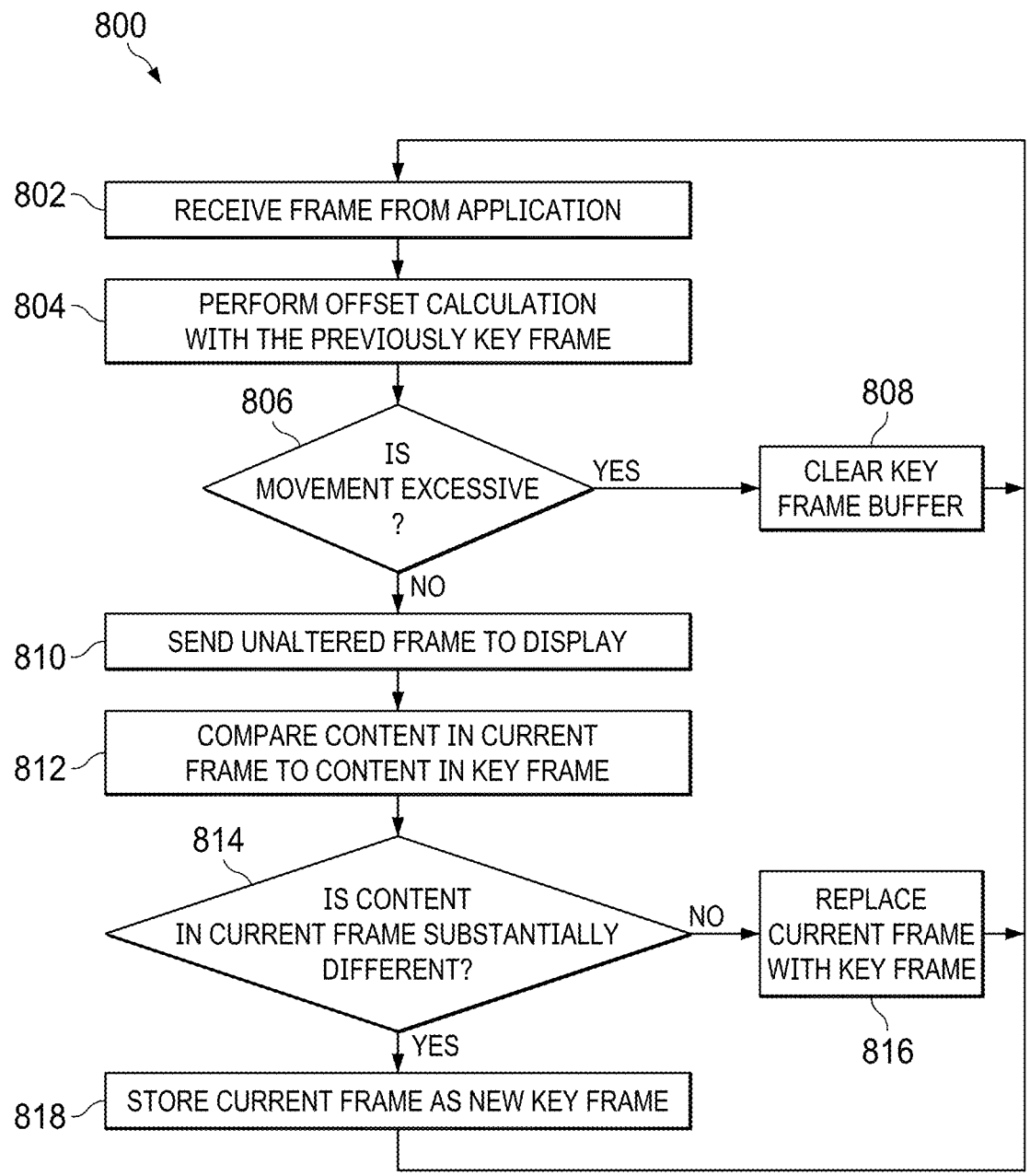
FIG. 8 illustrates another example method for stabilizing video imagery generated by an application on an IHS using a key frame keeping technique according to one embodiment of the present disclosure.

FIG. 8 illustrates another example method 800 for stabilizing video imagery generated by an application on an IHS using a key frame keeping technique according to one embodiment of the present disclosure. Initially at step 802, the method 800 receives a new frame from the application 106, and at step 804, performs an offset calculation with the previously received key frame. In one embodiment, the offset calculation may be performed in a similar manner to how the method 500 performs the offset calculation at step 504.

At step 806, the method 800 determines whether the movement is excessive. For example, the method 800 may compare the estimated level of movement against a threshold value, and if the level of movement exceeds the threshold value, determine that the frame should be replaced with a stored key frame that is stored in a key buffer. The meaning and purpose of the key frame will be described in detail herein below. In one embodiment, the threshold value may be similar to the threshold value described above at step 606. Nevertheless, if the movement is excessive, processing continues at step 810; otherwise, processing continues at step 808 in which the key frame buffer that stores the key frame is cleared, and the unaltered frame is sent to a display 112 at step 810.

At step 812, the method 800 compares the content in the current frame to the content in the key frame. Thereafter at step 814, the method 800 determines whether the content in the current frame is substantially different than the content in the key frame. Such a case may exist, for example, when the video imagery changes dramatically, such as when substantial movement occurs, or when a new scene is included in the video stream. Nevertheless, if the content in the current frame is substantially different, processing continues at step 818; otherwise, processing continues at step 816 in which the current frame is replaced by the key frame in the video stream. At step 818, the method 800 stores the current frame as the new key frame in the frame buffer.

The aforedescribed process is continually performed for each frame received from the application 106. Nevertheless, when use of the method 800 is no longer needed or desired, the method 800 ends.

Although FIGS. 5, 6, and 8 each describe an example method 500, 600, and 800 that may be performed to stabilize video imagery, the features of the methods 500, 600, and 800 may be embodied in other specific forms without deviating from the spirit and scope of the present disclosure. For example, either of the methods 500, 600, and 800 may perform additional, fewer, or different operations than those described in the present examples. As another example, certain steps of either of the aforedescribed methods 500, 600, and 800 may be performed in a sequence different from that described above. As yet another example, certain steps of either of the methods 500, 600, and 800 may be performed by other components in the IHS 104 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

What is claimed is:

1. An Information Handling System (IHS), comprising:
at least one memory coupled to at least one processor, the memory having program instructions stored thereon that, upon execution, cause the IHS to:
receive a video stream from an application executed on the IHS, wherein the video stream comprises a plurality of ongoing frames;
identify a level of jitter in the video stream;
to process the video stream:
determine a level of offset of a current frame to a previously received frame;
when the level of offset exceeds a specified threshold, re-position the current frame to compensate for the level of offset; and
receive user input for controlling the threshold level by a user; and
display the processed video stream on a display, wherein the display displays the processed video stream in place of the video stream generated by the application.

2. The IHS of claim 1, wherein the instructions, upon execution, further cause the IHS to process the video stream:
determine a level of offset of a current frame to a plurality of previously received frames using an artificial intelligence (AI) estimation technique; and
when the level of offset exceeds a specified threshold, re-position the current frame to compensate for the level of offset.

3. The IHS of claim 1, wherein the instructions, upon execution, further cause the IHS to process the video stream:
determine level of offset of a current frame to a previously received frame; and
when the level of offset exceeds a specified threshold, apply a software low-pass filter to the current frame to compensate for the level of offset.

4. The IHS of claim 1, wherein the instructions, upon execution, further cause the IHS to process the video stream:
determine a level of content of a current frame to a previously received frame;
when the level of content exceeds a specified threshold, replace a stored key frame with the current frame;
determine a level of offset of an ensuing frame relative to the key frame; and
when the level of offset exceeds a specified threshold, re-position the ensuing frame to compensate for the level of offset.

5. The IHS of claim 1, wherein the application comprises a game.

6. The IHS of claim 1, wherein the instructions, upon execution, further cause the IHS to display the processed video stream in place of the received video stream using a hardware Application Program Interface (API).

7. The IHS of claim 1, wherein the level of jitter comprises at least one of a linear offset and a rotational offset.

8. An image stabilization method comprising:
receiving, using instructions stored in at least one memory and executed by at least one processor, a video stream from an application executed on the IHS, wherein video stream comprises a plurality of ongoing frames;

identifying, using the instructions, a level of jitter in the video stream;
to process, using the instructions, the video stream:
determining a level of offset of a current frame to a previously received frame;
when the level of offset exceeds a specified threshold, re-positioning the current frame to compensate for the level of offset; and
receiving user input for controlling the threshold level by a user; and
displaying, using the instructions, the processed video stream on a display, wherein the display displays the processed video stream in place of the video stream generated by the application.

9. The image stabilization method of claim 8, further comprising:
determining a level of offset of a current frame to a plurality of previously received frames using an artificial intelligence (AI) estimation technique; and
when the level of offset exceeds a specified threshold, re-positioning the current frame to compensate for the level of offset.

10. The image stabilization method of claim 8, further comprising:
determining a level of offset of a current frame to a previously received frame; and
when the level of offset exceeds a specified threshold, applying a software low-pass filter to the current frame to compensate for the level of offset.

11. The image stabilization method of claim 8, further comprising:
determining a level of content of a current frame to a previously received frame;
when the level of content exceeds a specified threshold, replacing a stored key frame with the current frame;
determining a level of offset of an ensuing frame relative to the key frame; and
when the level of offset exceeds a specified threshold, re-positioning the ensuing frame to compensate for the level of offset.

12. A non-transitory hardware memory device having program instructions stored thereon that, upon execution by a processor, cause the instructions to:
receive a video stream from an application executed on the IHS, wherein video stream comprises a plurality of ongoing frames;
identify a level of jitter in the video stream;
to process the video stream:
determine a level of offset of a current frame to a previously received frame;
when the level of offset exceeds a specified threshold, re-position the current frame to compensate for the level of offset; and
receive user input for controlling the threshold level by a user; and
display the processed video stream on a display, wherein the display displays the processed video stream in place of the video stream generated by the application.

13. The non-transitory hardware memory device of claim 12, wherein the instructions are further executed to process the video stream:
determine a level of offset of a current frame to a plurality of previously received frames using an artificial intelligence (AI) estimation technique; and
when the level of offset exceeds a specified threshold, re-position the current frame to compensate for the level of offset.

14. The non-transitory hardware memory device of claim 12, wherein the instructions are further executed to process the video stream:
determine a level of offset of a current frame to a previously received frame; and
when the level of offset exceeds a specified threshold, apply a software low-pass filter to the current frame to compensate for the level of offset.

15. The non-transitory hardware memory device of claim 12, wherein the instructions are further executed to process the video stream:
determine a level of content of a current frame to a previously received frame; and
when the level of content exceeds a specified threshold, replace a stored key frame with the current frame;
determine a level of offset of an ensuing frame relative to the key frame; and
when the level of offset exceeds a specified threshold, re-positioning the ensuing frame to compensate for the level of offset.

* * * * *